(12) United States Patent
Englmeier

(10) Patent No.: US 11,585,263 B2
(45) Date of Patent: Feb. 21, 2023

(54) VEHICLE HAVING A HYBRID DRIVE

(71) Applicant: Dr. Ing. h.c. F. Porsche Aktiengesellschaft, Stuttgart (DE)

(72) Inventor: Michael Englmeier, Lenting (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 37 days.

(21) Appl. No.: 17/476,679

(22) Filed: Sep. 16, 2021

(65) Prior Publication Data

US 2022/0162983 A1   May 26, 2022

(30) Foreign Application Priority Data

Nov. 20, 2020   (DE) .................... 10 2020 130 786.1

(51) Int. Cl.
  *F02B 29/04*   (2006.01)
  *B60L 58/26*   (2019.01)
  *B60L 58/27*   (2019.01)

(52) U.S. Cl.
  CPC .......... *F02B 29/0475* (2013.01); *B60L 58/26* (2019.02); *B60L 58/27* (2019.02); *F02B 29/0418* (2013.01)

(58) Field of Classification Search
  CPC .... B60K 2001/005; B60K 11/06; B60K 1/04; F02M 31/042; F02M 35/10249; F02M 31/13; H01M 10/613; H01M 10/615; H01M 2220/20; H01M 10/6563; H01M 10/625; H01M 10/6571; Y02E 60/10; B60L 58/26; F02B 29/0475; F02B 29/0418; F02B 37/168

USPC .......... 180/68.5, 68.2; 454/105; 123/184.21, 123/559.1

See application file for complete search history.

(56) References Cited

U.S. PATENT DOCUMENTS

| | | | | |
|---|---|---|---|---|
| 2,104,769 A | * | 1/1938 | Saunders ................ | B60R 16/04 123/41.1 |
| 4,468,440 A | * | 8/1984 | Evjen .................. | H01M 10/613 429/8 |
| 4,976,327 A | * | 12/1990 | Abujudom, II ........ | B60K 11/00 180/68.5 |
| 5,481,433 A | * | 1/1996 | Carter ................ | H05K 7/20918 174/16.3 |

(Continued)

FOREIGN PATENT DOCUMENTS

| | | |
|---|---|---|
| CN | 106762088 A | 5/2017 |
| CN | 111347929 A | 6/2020 |

(Continued)

*Primary Examiner* — J. Todd Newton
(74) *Attorney, Agent, or Firm* — RatnerPrestia

(57) ABSTRACT

A vehicle has a hybrid drive including an internal combustion engine and at least one electric motor. The hybrid drive has a charging device for generating an air flow. A charge air path guides the air flow from the charging device to the internal combustion engine. A charge air cooler is arranged in the charge air path between the charging device and the internal combustion engine. The hybrid drive has an electric battery for supplying electric power to the at least one electric motor. The effort involved in cooling the battery is reduced if the battery is incorporated into the charge air path between the charge air cooler and the internal combustion engine in such a way that the air flow can flow through and/or around it.

10 Claims, 1 Drawing Sheet

(56) References Cited

U.S. PATENT DOCUMENTS

| | | | | |
|---|---|---|---|---|
| 5,542,489 | A | * | 8/1996 | Allison .................. B60R 16/04 219/202 |
| 6,152,096 | A | * | 11/2000 | Setsuda .................. B60R 16/04 180/68.5 |
| 6,220,383 | B1 | * | 4/2001 | Muraki ............. H01M 10/6563 180/68.5 |
| 6,814,042 | B2 | * | 11/2004 | Cutts ....................... F02B 39/10 123/184.21 |
| 6,889,672 | B2 | * | 5/2005 | Criddle .................. F02B 33/40 180/68.5 |
| 6,892,713 | B2 | * | 5/2005 | Criddle ........... F02M 35/10026 180/68.5 |
| 6,920,867 | B2 | * | 7/2005 | Cutts ............... F02M 35/10222 123/184.21 |
| 7,045,236 | B1 | * | 5/2006 | Andrew ............. H01M 50/271 429/83 |
| 2003/0134189 | A1 | * | 7/2003 | Kanai ............. H01M 10/6563 429/120 |
| 2003/0226653 | A1 | * | 12/2003 | Takedomi .......... H05K 7/20918 903/906 |
| 2004/0206341 | A1 | * | 10/2004 | Clarkson ............. F02D 41/0007 123/564 |
| 2018/0163607 | A1 | | 6/2018 | Uto et al. |

FOREIGN PATENT DOCUMENTS

| | | |
|---|---|---|
| DE | 102010049918 A1 | 6/2011 |
| DE | 102013208181 A1 | 11/2014 |
| DE | 102014017245 A1 | 6/2016 |
| EP | 3666570 A1 | 6/2020 |

* cited by examiner

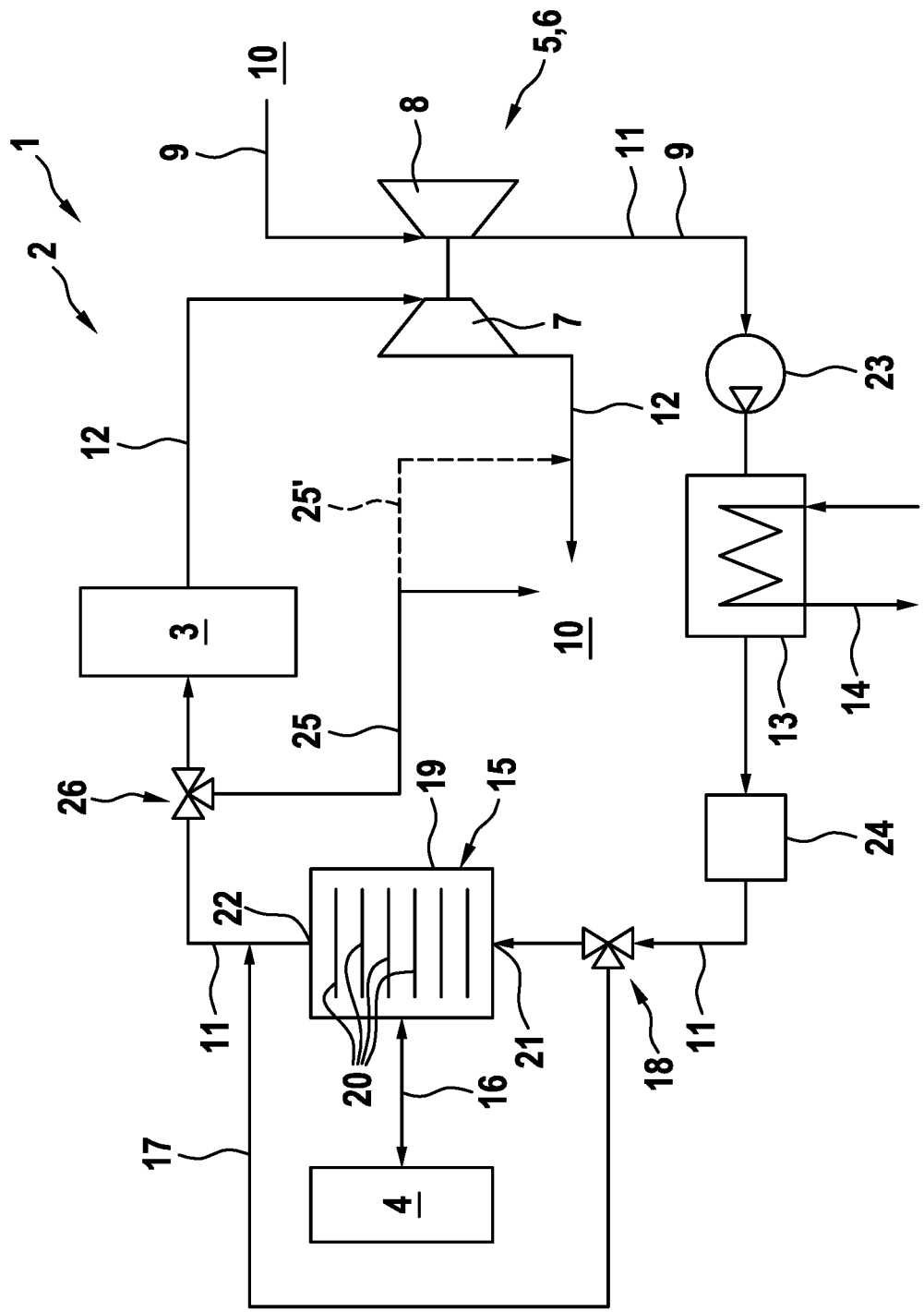

VEHICLE HAVING A HYBRID DRIVE

CROSS-REFERENCE TO RELATED APPLICATION

This application claims priority to German Patent Application No. 10 2020 130 786.1, filed Nov. 20, 2020, the content of such application being incorporated by reference herein in its entirety.

FIELD OF THE INVENTION

The present invention relates to a vehicle having a hybrid drive.

BACKGROUND OF THE INVENTION

A hybrid vehicle is known from DE 10 2010 049 918 A1, which is incorporated by reference herein, for example. The hybrid drive of this vehicle comprises an internal combustion engine and at least one electric motor, each for driving the vehicle. Furthermore, the hybrid drive is equipped with a charging device for generating a pressure-charged air flow. A charge air path guides the air flow from the charging device to the internal combustion engine. A charge air cooler is arranged in the charge air path between the charging device and the internal combustion engine. The hybrid drive is furthermore equipped with an electric battery for supplying electric power to the at least one electric motor.

In the known vehicle, the charging device is formed by an exhaust gas turbocharger, and the charge air cooler is formed by an absorption refrigeration device. In this case, this absorption refrigeration device is incorporated into a refrigeration circuit, which is coupled via a heat exchanger to a cooling circuit, into which the battery is incorporated.

Another hybrid vehicle is known from US 2018/0163607 A1, which is incorporated by reference herein, in which the internal combustion engine, the charge air cooler and the battery, as well as power electronics, are incorporated into a common cooling system.

DE 10 2013 208 181 A1, which is incorporated by reference herein, discloses a common cooling system for a battery and an exhaust gas turbocharger.

A similar cooling system is also known from CN 106 762 088 B, which is incorporated by reference herein.

CN 111 347 929 A, which is incorporated by reference herein, discloses a heat exchanger arrangement which comprises a battery heat exchanger and a charge air heat exchanger.

SUMMARY OF THE INVENTION

Incorporating the battery into a cooling circuit is associated with a relatively high effort. In particular, appropriate lines must be laid in the vehicle. This is associated with a considerable installation space requirement and significant additional weight. When liquid coolants are used, an additional increased effort is required to avoid an electrical short circuit across or within the battery. In the case of gaseous coolants, additional blowers are required to compensate for the pressure drop in the flow through the battery.

The present invention is concerned with the problem of specifying an improved embodiment for a vehicle of the type mentioned at the outset, in which, in particular, the abovementioned disadvantages are eliminated or at least reduced.

In view of that problem, described herein is the concept of cooling the battery directly with cooled charge air. For this purpose, cooled charge air is applied directly to the battery. In other words, the battery is cooled without an additional cooling circuit. The problems of liquid coolants do not occur here. Furthermore, no additional blower is required since the charge air is transported at elevated pressure in any case, and therefore the pressure drop across the battery is comparatively small.

To this end, the invention proposes that the battery be incorporated into the charge air path between the charge air cooler and the internal combustion engine in such a way that the air flow can flow through and/or around the battery. The air flow guided in the charge air path is thus applied directly to the battery. Depending on the design of the battery, flow of the cooled air flow around the battery may be sufficient. Depending on the design of the battery, flow of the cooled air flow through the battery may likewise be envisaged in order to bring about particularly efficient cooling. In this case, the air flow cooled with the aid of the charge air cooler absorbs heat from the battery, as a result of which the air flow is again heated somewhat before it reaches the internal combustion engine. The battery is preferably a high-voltage battery, i.e. a battery with a voltage in a range of from 60 volts to 1,500 volts. In particular, the battery voltage can be at least 200 volts or at least 400 volts.

According to an advantageous embodiment, the charge air path may have a battery bypass for bypassing the battery. Accordingly, when the battery bypass is activated, the air flow bypasses the battery, ensuring that there is no heat transfer between the battery and the air flow. When the battery bypass is deactivated, there is a flow around or through the battery, as envisaged, in order to bring about the desired heat transfer between the battery and the air flow. With the aid of the battery bypass, the air flow can bypass the battery in cases where no cooling of the battery is required, improving the efficiency of the pressure charging of the internal combustion engine. Moreover, it is possible to conceive of operating states of the hybrid vehicle in which the battery should not be cooled. On the contrary, it is even possible to conceive of operating states in which the battery should be heated in order to bring it to operating temperature.

According to an advantageous development, the charge air path can have a battery bypass valve for controlling the battery bypass, the valve having the effect, in a first valve position, that the air flow flows through and/or around the battery, with the result that there is a thermal interaction between the battery and the air flow. In contrast, in a second valve position, the battery bypass valve has the effect that the air flow bypasses the battery, with the result that there is no thermal interaction between the air flow and the battery.

In another advantageous embodiment, the battery can have a battery housing and a plurality of battery cells arranged in the battery housing. The battery is then incorporated into the charge air path in such a way that the air flow flows through the battery housing and flows around the battery cells arranged therein. This results in direct contact between the battery cells and the air flow, thereby achieving direct heat transfer between the battery cells and the air flow. For incorporating the battery into the charge air path, the battery housing can have a corresponding inlet connection and a corresponding outlet connection. The battery can be configured as a pouch battery, for example, and can have a plurality of pouch cells as battery cells.

In another embodiment, an electric delivery device for delivering the air flow within the charge air path can be arranged in the charge air path between the charging device and the charge air cooler. When the internal combustion engine is switched on, the boost pressure in the air flow can be increased with the aid of such an electric delivery device, e.g. for a booster function. When the internal combustion engine is switched off, the delivery device can be used to continue delivery of an air flow in the charge air path in order, for example, to cool the battery even when the internal combustion engine is switched off.

According to another advantageous embodiment, a preferably electric heating device for heating the air flow can be arranged in the charge air path between the charge air cooler and the battery. With the aid of this heating device, it is possible to heat the air flow in order to heat the battery with the aid of the heated air flow. This is advantageous, in particular, if the vehicle is being driven in pure electric mode, that is to say if the internal combustion engine is switched off. Thus, the battery can be heated to the desired operating temperature.

If the delivery device described above is also present, the heating device can expediently be arranged between this delivery device and the battery in the charge air path. In other words, the heating device can be arranged upstream or preferably downstream of the charge air cooler in the charge air path with respect to the flow direction of the air flow within the charge air path.

Another embodiment proposes that the charge air path has an engine bypass for internal or external bypassing of the internal combustion engine. As a result, it is possible in a particularly simple manner to use the charge air path for temperature control of the battery when the internal combustion engine is switched off. In the case of an external engine bypass, the air flow does not flow through the internal combustion engine but, for example, through additional sections of the charge air path, which lead past the internal combustion engine. In the case of the internal engine bypass, the air flow can flow through the switched-off internal combustion engine. For this purpose, it is in particular conceivable to set the internal combustion engine in such a way for the switched-off state that, at least in the case of one cylinder, both at least one inlet valve and at least one outlet valve are open in order to allow the air flow to flow through the internal combustion engine.

According to an advantageous development, the charge air path can have an engine bypass valve for controlling the engine bypass, wherein the engine bypass valve has the effect, in a first valve position, that the air flow reaches the internal combustion engine while, in a second valve position, it has the effect that the air flow bypasses the internal combustion engine internally or externally. For example, the external engine bypass may be open to the environment since the air flow does not contain any combustion exhaust gases when the internal combustion engine is switched off. It is likewise conceivable for the engine bypass to be connected to an exhaust line of the internal combustion engine, with the result that, when the internal combustion engine is switched off, the air flow passes into the environment through the engine bypass and through the exhaust line.

In principle, the charging device can be configured as a compressor driven by an electric motor. However, an embodiment is preferred in which the charging device is configured as an exhaust gas turbocharger. The exhaust gas turbocharger then has, in the customary manner, a compressor, to which the charge air path is connected, and a turbine, which is drive-connected to the compressor and is arranged in an exhaust line of the internal combustion engine.

Further important features and advantages of the invention will be found in the dependent claims, the drawing and the associated description of the figures with reference to the drawing.

It is self-evident that the features mentioned above and those that will be explained below can be used not only in the respectively specified combination but also in other combinations or on their own without departing from the scope of the invention. The abovementioned and yet to be mentioned constituents of a higher-level unit, such as, for example, a device, an apparatus or an assembly, which are designated separately, can form separate component parts or components of this unit or can be integral regions or sections of this unit, even if this is illustrated in a different way in the drawing.

BRIEF DESCRIPTION OF THE DRAWINGS

Preferred exemplary embodiments of the invention are illustrated in the drawing and are explained in greater detail in the following description, wherein identical reference signs refer to identical or similar or functionally identical components.

FIG. 1 shows a schematic illustration, in the form of a circuit diagram, of a vehicle with a hybrid drive.

DETAILED DESCRIPTION OF THE INVENTION

According to FIG. 1, a vehicle 1 comprises a hybrid drive 2, which has an internal combustion engine 3 and at least one electric motor 4. The hybrid drive 2 serves to drive the vehicle 1. Accordingly, both the internal combustion engine 3 and the respective electric motor 4 are used to drive the vehicle 1, in each case separately and in combination. It is clear that the hybrid drive 2 usually has more than one electric motor 4 for driving the vehicle 1, that is to say therefore that two or more electric motors 4 can be provided.

The vehicle 1 may in principle be any land vehicle, watercraft or aircraft. In this context, land vehicles are preferred. In particular, it may be a road vehicle and preferably a passenger vehicle.

The hybrid drive 2 is furthermore equipped with a charging device 5, which is used to generate a pressure-charged air flow. Here, the charging device 5 is configured as an exhaust gas turbocharger 6, which has a turbine 7 and a compressor 8. The compressor 8 generates the pressure-charged air flow. The turbine drives 7 the compressor 8. The compressor 8 is incorporated into a fresh air line 9, which is open on the suction side to an environment 10 and draws in fresh air there. On the pressure side, the fresh air line 9 is connected to the internal combustion engine 3. The pressure side of the fresh air line 9 is also referred to below as the charge air path 11, which guides the air flow from the charging device 5 to the internal combustion engine 3. The turbine 7 is incorporated into an exhaust line 12, which is connected to the internal combustion engine 3 on the pressure side and opens into the environment 10 on the outlet side via an exhaust system, not shown specifically here.

A charge air cooler 13, which is used to cool the pressure-charged air flow, is arranged in the charge air path 11 between the charging device 5 and the internal combustion engine 3. For this purpose, the charge air cooler 13 is incorporated into a cooling circuit 14.

The hybrid drive 2 furthermore has an electric battery 15, which serves to supply electric power to the respective electric motor 4. For this purpose, the battery 15 is connected in a suitable manner to a power supply network 16 or on-board power supply network 16 in the vehicle, to which the respective electric motor 4 is also connected. It is clear that this power supply network 16 can include other components, such as power electronics, inverters, and the like. The battery 15 is now incorporated into the charge air path 11 between the charge air cooler 13 and the internal combustion engine 3. As a result, the air flow can flow through or around the battery 15. In this case, the flow through or around the battery 15 takes place in such a way that there is heat transfer between the battery 15 and the air flow. Thus, the cooled charge air may be used to cool the battery 15.

The charge air path 11 has a battery bypass 17, which bypasses the battery 15. In this battery bypass 17, the air flow can bypass the battery 15, with the result that there is no heat transfer between the battery 15 and the air flow. Thus, when the battery bypass 17 is active, there is no thermal coupling between the battery 15 and the air flow. In contrast, when the battery bypass 17 is deactivated, there is a flow through or around the battery 15, and thus there is a thermal interaction between the air flow and the battery 15. To control the battery bypass 17, the charge air path 11 is equipped with a battery bypass valve 18, with which at least two valve positions can be set. In a first valve position, the battery bypass 17 is deactivated, with the result that the air flow flows through or around the battery 15. In a second valve position, the battery bypass 17 is activated, with the result that the air flow flows through the battery bypass 17 and bypasses the battery 15.

The battery 15 expediently has a battery housing 19 and a multiplicity of battery cells 20, which are arranged in the battery housing 19. The battery 15 is then expediently incorporated into the charge air path 11 in such a way that the air flow flows through the battery housing 19 and, in the process, flows around the battery cells 20 arranged therein. For flow around the battery cells 20, these can be arranged at a corresponding spacing from one another in the battery housing 19, e.g. by means of corresponding spacer elements and/or holders. As a result, there is direct contact and, accordingly, direct thermal interaction between the air flow and the battery cells 20. For this purpose, the charge air path 11, which is formed by corresponding lines, ducts, hoses and the like, can be connected to an inlet connection 21 of the battery housing 19 and to an outlet connection 22 of the battery housing 19. The battery 15 can be configured as a pouch battery whose battery cells 20 are configured as pouch cells.

In an alternative design, which is not shown here, the battery 15 itself can be arranged in a receiving housing which is connected to the charge air path 11, allowing the air flow to flow through the receiving housing, while the air flow then flows around the battery 15.

In the example shown here, an electric delivery device 23, which is used to deliver or drive the air flow in the charge air path 11, is arranged in the charge air path 11 between the charging device 5 and the charge air cooler 13. When the internal combustion engine 3 is switched on, the air flow is driven by the charging device 5. In this case, the additional delivery device 23 can be used as a booster if, in the case of the charging device 5 configured as an exhaust gas turbocharger 6, the exhaust gas from the internal combustion engine 3 has too little enthalpy to be able to drive the compressor 8 to the desired extent with the aid of the turbine 7. This may be the case particularly at a low operating temperature and/or low speed of the internal combustion engine 3. When the internal combustion engine 3 is switched off, the charging device 5 configured as an exhaust gas turbocharger 6 is also automatically switched off. In this case, the desired air flow for cooling the battery 15 can be generated with the aid of the additional delivery device 23. The delivery device 23 can be configured as a blower, pump, compressor or the like.

In the charge air path 11, a preferably electrically operated heating device 24, with the aid of which the air flow can be heated, can now optionally be arranged between the delivery device 23 and the battery 15. In the preferred example, the heating device 24 is incorporated into the charge air path 11 between the charge air cooler 13 and the battery 15. With the aid of the heating device 24, the air flow can be heated in order to be able to heat the battery 15 to an operating temperature, something that may be necessary in certain operating situations.

In the example shown here, the charge air path 11 can optionally be equipped with an external engine bypass 25, through which the air flow can bypass the internal combustion engine 3. The engine bypass 25 can open into the environment 10, for example. As an alternative, FIG. 1 indicates a variant in broken lines, in which the engine bypass 25' is connected on the outlet side to the exhaust line 12. If the charging device 5 is an exhaust gas turbocharger 6, the engine bypass 25' is connected to the exhaust line 12 downstream of the turbine 7. To control the engine bypass 25, the charge air path 11 can be equipped with an engine bypass valve 26, which can be transferred to at least two different valve positions. In a first valve position of the engine bypass valve 26, the engine bypass 25 is deactivated, with the result that the air flow is guided to the internal combustion engine 3. In a second valve position of the engine bypass valve 26, the engine bypass 25 is activated, with the result that the air flow bypasses the internal combustion engine 3 externally. The air flow then enters the environment 10 either directly or indirectly via the exhaust line 12.

Alternatively, it is also conceivable to equip the internal combustion engine 3 with an internal engine bypass. For this purpose, the internal combustion engine 3 can be configured in such a way that the air flow can flow through it with a relatively low pressure loss in the switched-off state. For this purpose, charge exchange valves can be positioned so as to be correspondingly open in order to allow flow through at least one combustion chamber in a cylinder of the internal combustion engine 3. In the case of such an internal engine bypass, it is possible in principle to dispense with an engine bypass valve 26.

What is claimed is:

1. A vehicle comprising: a hybrid drive including (i) an internal combustion engine, (ii) at least one electric motor operatively arranged to drive the vehicle, (iii) a charging device for generating an air flow, and (iv) an electric battery for supplying electric power to the at least one electric motor, a charge air passage configured to guide air flow from the charging device to the internal combustion engine, a charge air cooler arranged in the charge air passage between the charging device and the internal combustion engine, and wherein the electric battery is incorporated into the charge air passage between the charge air cooler and the internal combustion engine such that the air flow can flow through and/or around the electric battery.

2. The vehicle as claimed in claim 1, wherein the charge air passage has a battery bypass for bypassing the electric battery.

3. The vehicle as claimed in claim 2, wherein the charge air passage has a battery bypass valve for controlling the battery bypass, wherein, in a first valve position of the battery bypass valve, the air flow can flow through and/or around the battery, and, in a second valve position of the battery bypass valve, the air flow can bypass the electric battery.

4. The vehicle as claimed in claim 1, wherein the electric battery has a battery housing and a plurality of battery cells arranged in the battery housing, and the electric battery is incorporated into the charge air passage such that the air flow can flow through the battery housing and around the battery cells.

5. The vehicle as claimed in claim 1, further comprising an electric delivery device for delivering the air flow and that is arranged in the charge air passage between the charging device and the charge air cooler.

6. The vehicle as claimed in claim 5, further comprising a heating device for heating the air flow arranged in the charge air passage between the electric delivery device and the electric battery.

7. The vehicle as claimed in claim 1, further comprising a heating device for heating the air flow arranged in the charge air passage between the charge air cooler and the electric battery.

8. The vehicle as claimed in claim 1, wherein the charge air passage has an internal or external engine bypass for bypassing the internal combustion engine.

9. The vehicle as claimed in claim 8, wherein the charge air passage has an engine bypass valve for controlling the engine bypass, wherein in a first valve position of the engine bypass valve, the air flow reaches the internal combustion engine, and, in a second valve position of the engine bypass valve, the air flow bypasses the internal combustion engine.

10. The vehicle as claimed in claim 1, wherein the charging device is configured as an exhaust gas turbocharger.

* * * * *